Patented Mar. 8, 1949

2,463,819

UNITED STATES PATENT OFFICE 2,463,819

PREPARATION OF ACYLGUANYLTHIOUREAS

Russell L. Sperry, Stamford, Conn., assignor to American Cyanamid Company, New York, N. Y., a corporation of Maine No Drawing. Application February 8, 1945, Serial No. 576,899

9 Claims. (Cl. 260—402.5)

This invention relates to new and useful derivatives of guanylthiourea and to methods for their manufacture.

In particular, the guanylthiourea derivatives herein described are the acylguanylthioureas of the formula

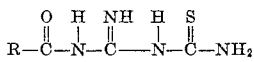

where R is chosen from the group consisting of alkyl and aryl. Typical examples of the alkyl and aryl groups included in the aforementioned classes are, for alkyl: methyl, ethyl, propyl, isopropyl, butyl, hexyl, octyl, undecyl, heptadecyl, and the like; and for aryl: phenyl, tolyl, xylyl, naphthyl, anthryl, and the like.

The acylguanylthioureas described herein are prepared by reacting the corresponding acyldicyandiamide with hydrogen sulphide according to the followed mechanism:

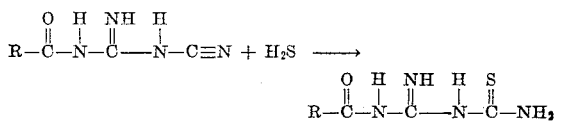

The acylguanylthioureas are useful as chemical intermediates in the production of rubber chemicals, chemotherapeutic agents, insecticides, and other materials.

The preparations of some typical acylguanylthioureas are described in the following examples. The addition of hydrogen sulphide to the acyldicyandiamides may be made at atmospheric pressure or above, but in the following examples it is preferred to add the hydrogen sulphide at atmospheric pressure. In the examples the parts are by weight.

The acyl dicyandiamides employed in the following examples may be prepared by first preparing an alkali metal or alkaline earth metal dicyandiamide in accordance with the process of U. S. Patent No. 2,357,261 which comprises mixing dicyandiamide with a slight excess of alkali metal or alkaline earth metal hydroxide in the presence of sufficient water to dissolve the reactants. The dicyandiamide salt is thereafter acylated in accordance with the process of U. S. Patent No. 2,407,161 by simply mixing it with an acylating agent in the presence of a small amount of water or other solvent at room temperature. The acylated dicyandiamide is thereafter recovered from the reaction mixture by neutralization with an acid, preferably a weak organic acid such as acetic or propionic acid.

EXAMPLE 1

Preparation of benzoylguanylthiourea

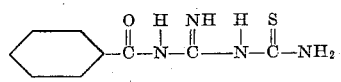

Hydrogen sulphide is bubbled through a mechanically stirred slurry of 376 parts of benzoyldicyandiamide in 1185 parts of alcohol for eight hours at a temperature of 25°–35° C. As the reaction progresses, the solution becomes yellow and all the benzoyldicyandiamide dissolves. As the exothermic reaction progresses, insoluble orange crystals of benzoylguanylthiourea separate from solution and, after the reaction subsides, the crystals are filtered from the reaction mixture. The mother liquor is diluted with excess water and additional product precipitates. The total yield of crude benzoylguanylthiourea is 97% of the theoretical value. After recrystallization from methanol, the melting point of the yellow needles is 173°–174° C. When heated in a solution of ammoniacal silver nitrate, a precipitate of silver sulphide results.

EXAMPLE 2

Preparation of lauroylguanylthiourea

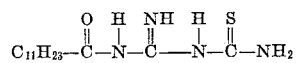

Hydrogen sulphide is bubbled through a mechanically stirred slurry of 30 parts of lauroyldicyandiamide in 237 parts of alcohol for four hours at 50°–60° C. As the reaction progresses, the solution becomes yellow and all the lauroyldicyandiamide dissolves so that a clear solution results. When the exothermic reaction subsides, the free lauroylguanylthiourea, which is very soluble in organic solvents, may be recovered from the alcohol as the hydrochloride. For instance, concentrated hydrochloric acid is added carefully until a slight excess over the theoretical amount is present. The yellow crystalline crude lauroylguanylthiourea hydrochloride is recovered and, after recrystallization from acetone as pale yellow plates, melts at 153°–156° C. The free base may be regenerated by adding alkali to an aqueous slurry of the hydrochloride salt.

EXAMPLE 3

Preparation of butyrylguanylthiourea

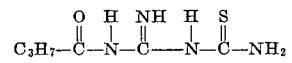

Hydrogen sulphide is bubbled into a mechanically stirred slurry of 29 parts of butyryldicyandiamide in 197 parts of alcohol for four hours at substantially 55° C. As the reaction proceeds, the solution becomes yellow and all the butyrldicyandiamide dissolves. When the exothermic reaction subsides, a small amount of insoluble impurities are filtered from the reaction mixture, and the latter is diluted with three times its volume of water. A pale yellow precipitate of butyrylguanylthioureau is formed, and the crude product is recovered by filtration. After recrystallization from methanol it melts with decomposition at 138°–140° C.

By means of similar reactions, other acylguanylthioureas are prepared from the corresponding acyldicyandiamides.

The acylguanylthioureas herein described react with silver nitrate to form silver sulphide, and are soluble in alkaline solution. They yield guanides as a result of alkaline hydrolysis and cyclization. In the cold, the formation of guanides is slow, but when hot, the reaction is rapid. However, when hydrolyzed by strong mineral acids the acylguanylthioureas yield acylmonothiobiurets.

While this invention has been described with reference to specific embodiments, it is to be understood that it is not to be limited thereto but is to be construed broadly and limited only by the scope of the appended claims.

What is claimed is:

1. An acylguanylthiourea of the formula

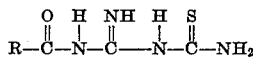

where R is chosen from the group consisting of alkyl and aryl radicals.

2. Benzoylguanylthiourea.
3. Lauroylguanylthiourea.
4. Butyrylguanylthiourea.
5. A method of preparing an acylguanylthiourea of the formula

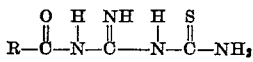

where R is chosen from the group consisting of alkyl and aryl radicals, which includes the steps of reacting an acyldicyandiamide of the formula

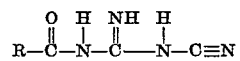

where R has the meaning above given, with hydrogen sulphide at a temperature below substantially 60° C. and at substantially atmospheric pressure, and recovering the acylguanylthiourea.

6. The method of claim 5 in which the reaction is run in alcohol.

7. A method of preparing benzoylguanylthiourea which includes the steps of reacting an alcoholic slurry of benzoyldicyandiamide with hydrogen sulphide at substantially atmospheric pressure and at a temperature within the range of about 25°–35° C., and recovering the benzoylguanylthiourea.

8. A method of preparing lauroylguanylthiourea which includes the steps of reacting an alcoholic slurry of lauroyldicyandiamide with hydrogen sulphide at substantially atmospheric pressure and at a temperature within the range of about 50°–60° C., and recovering the lauroylguanylthiourea.

9. A method of preparing butyrylguanylthiourea which includes the steps of reacting an alcoholic slurry of butyryldicyandiamide with hydrogen sulphide at substantially atmospheric pressure and at about 55° C., and recovering the butyrylguanylthiourea.

RUSSELL L. SPERRY.

REFERENCES CITED

The following references are of record in the file of this patent:

UNITED STATES PATENTS

| Number | Name | Date |
| --- | --- | --- |
| 2,323,075 | Orthner et al. | June 29, 1943 |
| 2,397,667 | Kaiser et al. | Apr. 2, 1946 |
| 2,407,161 | Kaiser et al. | Sept. 3, 1946 |

OTHER REFERENCES

Slotta et al., "Berichte der Deutschen chemischen Gesellschaft," 62, 1402 (1929).